US009982408B2

(12) United States Patent
Fennis et al.

(10) Patent No.: US 9,982,408 B2
(45) Date of Patent: May 29, 2018

(54) GEAR PAIR FOR A LIFTING VESSEL

(71) Applicant: SIEMENS AKTIENGESELLSCHAFT, München (DE)

(72) Inventors: Ronald Fennis, AS Winterswijk (NL); Frans Hulshof, KD Winterswijk (NL)

(73) Assignee: Siemens Aktiengesellschaft, München (DE)

( * ) Notice: Subject to any disclaimer, the term of this patent is extended or adjusted under 35 U.S.C. 154(b) by 0 days. days.

(21) Appl. No.: 15/309,489

(22) PCT Filed: Apr. 22, 2015

(86) PCT No.: PCT/EP2015/058662
§ 371 (c)(1),
(2) Date: Nov. 8, 2016

(87) PCT Pub. No.: WO2015/169594
PCT Pub. Date: Nov. 12, 2015

(65) Prior Publication Data
US 2017/0204579 A1 Jul. 20, 2017

(30) Foreign Application Priority Data

May 8, 2014 (EP) .................................. 14167457

(51) Int. Cl.
*E02B 17/08* (2006.01)
*B66F 3/02* (2006.01)
(Continued)

(52) U.S. Cl.
CPC ............ *E02B 17/0818* (2013.01); *B66F 3/02* (2013.01); *B66F 3/44* (2013.01); *F16H 19/04* (2013.01);
(Continued)

(58) Field of Classification Search
CPC ......... E02B 17/0818; E02B 2017/0091; E02B 2017/0056; E02B 17/08; B66F 3/44;
(Continued)

(56) References Cited

U.S. PATENT DOCUMENTS

| 221,775 A | * | 11/1879 | Burrows | ............... F16H 19/043 |
| | | | | 144/246.1 |
| 1,711,103 A | * | 4/1929 | Smith | ................... F03B 13/186 |
| | | | | 74/131 |

(Continued)

FOREIGN PATENT DOCUMENTS

| CN | 101111448 A | 1/2008 |
| CN | 201531018 U | 7/2010 |

(Continued)

*Primary Examiner* — Christopher M Koehler
*Assistant Examiner* — Mahdi H Nejad
(74) *Attorney, Agent, or Firm* — Henry M. Feiereisen LLC

(57) ABSTRACT

A gear pair for a lifting vessel includes two gear units driving in opposite directions of rotation and configured for engagement in two tooth racks on a jack-up leg, respectively. Each gear unit includes a drive shaft for connection to a drive, an output shaft for connection to a drive pinion, a transmission housing, a planetary stage mounted in the transmission housing, and a torque support configured to enable support of the gear unit on the other gear unit. The torque support surrounds the transmission housing of the other gear unit in a pincer-like manner and contacts the transmission housing symmetrically with respect to a straight line connecting the output shafts of the gear units at two support points which in relation to a vertical plane extending through the output shaft of the other gear unit are located offset towards the gear unit having the torque support.

12 Claims, 6 Drawing Sheets

(51) Int. Cl.
*B66F 3/44* (2006.01)
*F16H 19/04* (2006.01)
*F16H 1/28* (2006.01)
*F16H 57/02* (2012.01)
*E02B 17/00* (2006.01)
*E02B 17/02* (2006.01)

(52) U.S. Cl.
CPC ......... *B66F 2700/03* (2013.01); *E02B 17/021* (2013.01); *E02B 2017/0056* (2013.01); *E02B 2017/0091* (2013.01); *F16H 1/28* (2013.01); *F16H 57/02* (2013.01)

(58) Field of Classification Search
CPC ........ B66F 3/02; B66F 2700/03; F16H 19/04; F16H 57/02; F16H 1/28; F16H 1/32; B63B 35/44; B30B 3/00; B29C 43/24; B02C 4/02; B02C 4/28
USPC ........ 254/95, 97, 100, 98, 103; 74/130, 131, 74/132, 133
See application file for complete search history.

(56) References Cited

U.S. PATENT DOCUMENTS

| | | | | |
|---|---|---|---|---|
| 3,011,467 | A * | 12/1961 | Letourneau | E02B 17/0818 114/265 |
| 4,678,165 | A * | 7/1987 | Eloranta | E02B 17/0818 254/97 |
| 5,139,366 | A * | 8/1992 | Choate | E02B 17/0818 254/95 |
| 5,486,069 | A * | 1/1996 | Breeden | E02B 17/06 254/112 |
| 6,227,065 | B1 * | 5/2001 | Petersen | F16H 19/04 384/295 |
| 6,652,194 | B2 * | 11/2003 | Ingle | E02B 17/04 254/105 |
| 2003/0007838 | A1 * | 1/2003 | Ingle | E02B 17/04 405/196 |
| 2012/0034034 | A1 * | 2/2012 | Xu | B63B 35/4413 405/196 |
| 2013/0189038 | A1 * | 7/2013 | Lenders | B63B 35/4413 405/196 |
| 2017/0144714 | A1 * | 5/2017 | Dupay | B62D 53/0814 |

FOREIGN PATENT DOCUMENTS

| | | | |
|---|---|---|---|
| CN | 202323912 U | | 7/2012 |
| CN | 102628264 A | | 8/2012 |
| CN | 203603132 U | | 5/2014 |
| DE | 4019363 C1 | | 8/1991 |
| DE | 19521205 A1 | | 12/1996 |
| DE | 10026840 | * | 12/2001 |
| DE | 10026840 A1 | * | 12/2001 |
| JP | H02233152 A | | 9/1990 |
| WO | WO 9213639 A1 | | 8/1992 |

* cited by examiner

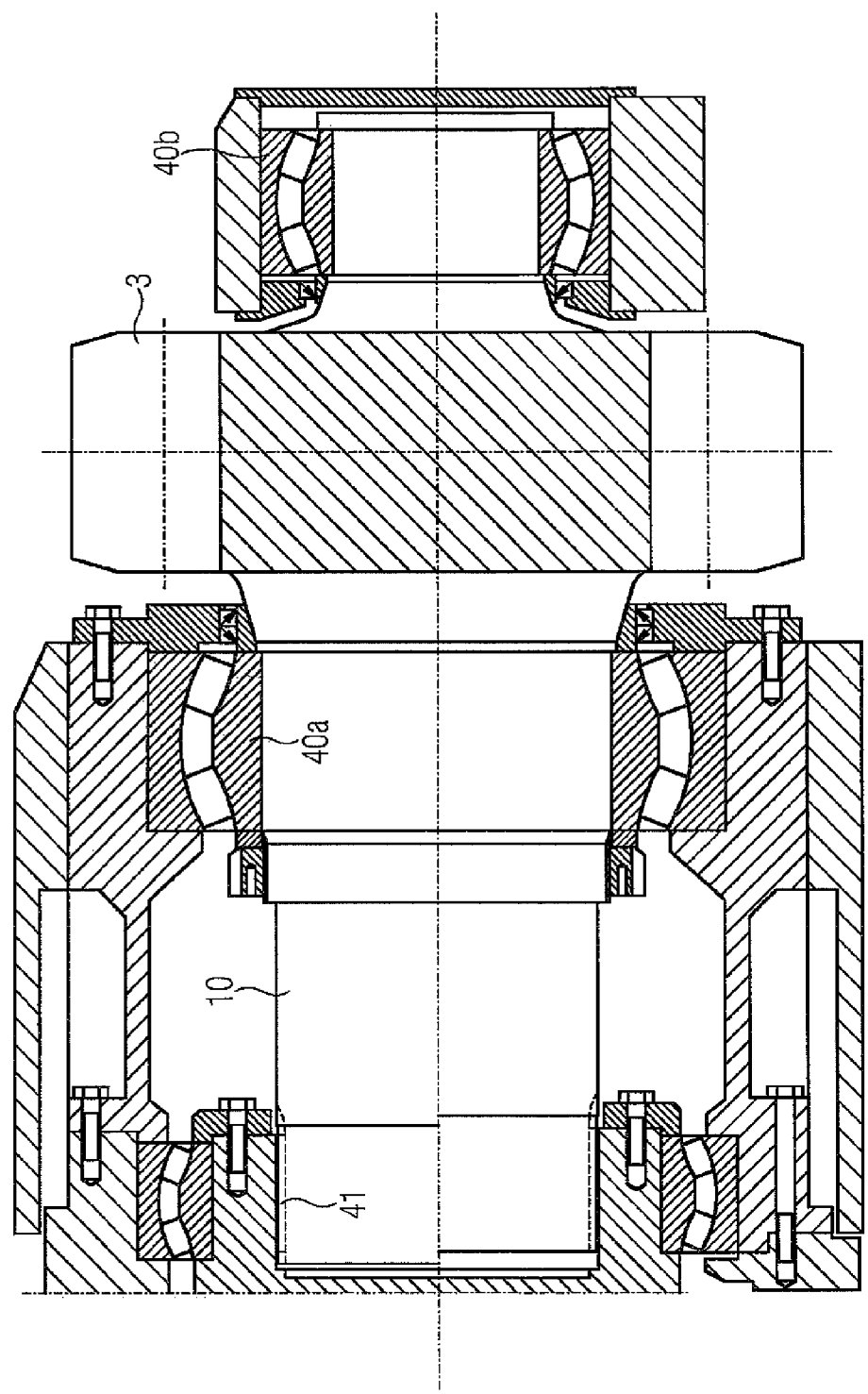

GEAR PAIR FOR A LIFTING VESSEL

CROSS-REFERENCES TO RELATED APPLICATIONS

This application is the U.S. National Stage of International Application No. PCT/EP2015/058662, filed Apr. 22, 2015, which designated the United States and has been published as International Publication No. WO 2015/169594 A1 which claims the priority of European Patent Application, Serial No. 14167457.2, filed May 8, 2014, pursuant to 35 U.S.C. 119(a)-(d).

BACKGROUND OF THE INVENTION

The present invention relates to a gear pair for a lifting vessel.

Such a gear pair for a lifting vessel is known from U.S. Pat. No. 4,678,165 A (Rauma-Repola Oy) Jul. 7, 1987.

SUMMARY OF THE INVENTION

The object of the invention is to improve the gear pair for a lifting vessel.

The object is achieved by a gear pair for a lifting vessel for a rack and pinion drive for lowering and raising a jack-up leg of a lifting vessel, with the gear pair including two gear units acting as reduction gears each having a drive and output shaft. The drive shafts are each provided for connection to a drive, e.g. an electric motor or a hydraulic motor. The output shafts are each provided for connection to a drive pinion for engagement in one of two toothed racks fitted on the jack-up leg. The output shafts of both gear units are in opposite directions of rotation. Each gear unit has a planetary stage mounted in a transmission housing. Each gear unit is supported with the aid of a torque support on the other respective gear unit. The torque support of each gear unit surrounds the transmission housing of the other respective gear unit in a pincer-like manner. The torque support of each gear unit is supported on the transmission housing of the other respective gear unit symmetrically with respect to a straight line connecting the output shafts at two support points. The support points are located relative to a vertical plane extending through the output shaft of the other respective gear unit towards the gear unit which has the torque support.

Here, the term "lifting vessels" covers so-called jack-up legs and jack-up rigs or jack-up platforms. A jack-up vessel is understood to mean a vessel with its own drive, having lowerable legs (so-called jack-up legs) on which it can be mounted on the bottom of a body of water. A jack-up rig or platform is understood to mean a buoyant platform without its own drive, having lowerable legs on which it can be mounted on the bottom of a body of water. Lifting vessels are used, for example, for constructing offshore wind turbines or as offshore drilling platforms for the extraction of oil and gas.

A lifting vessel for a lowerable leg of a lifting vessel is understood to mean a device by means of which the leg is lowered to the bottom of a body of water and can be raised from there.

The aforementioned patent specification U.S. Pat. No. 4,678,165 A describes a system of a torque support of two parallel, horizontally opposed planetary gears with the output shafts in opposite directions of rotation as a drive of a rack and pinion with drive pinions on both sides, wherein the torque supports of these two gears are perpendicular and interconnected by means of coupling rods. As an individual drive, each gear drives a drive pinion, wherein two drive pinions are arranged next to each other and several one above the other in a so-called lifting frame, i.e. a support structure for storage of the gears. The rotational axes of the two gears together with the two points of articulation of the interlinked torque supports form a rectangle which under the influence of the torques and reaction forces derived therefrom can be shifted into a parallelogram in order to thus obtain the same torque in both drive pinions and thus in both gears. The coupling rod between the two torque supports can absorb both compressive and tensile forces. However, it only acts when torques are pending.

With uneven torques in both pinions, a rotation of the two transmission housings and the permanently joined torque supports around the center axes of the output shafts takes place, whereby a drive pinion runs at a higher speed with regard to its gear, and the other drive pinion runs at a lower speed with regard to its gear. It could also be said that the gear ratio in a gear is temporarily higher and in the adjacent gear simultaneously temporarily lower here. The drive pinions can only run synchronously because they engage with the same jack-up leg with the same gearing on both sides. A prerequisite for the effect of the system is that the motors have sufficient torque reserve and a steep torque curve at operating speed.

The present invention has several advantages compared to the prior art described in U.S. Pat. No. 4,678,165 A. While the system described in U.S. Pat. No. 4,678,165 A aims to achieve torque equality in both drive pinions, the present invention achieves a defined and minimum bearing load of the drive pinion bearing, a specific minimum load of the planetary carrier bearing of the two parallel gears, a cost-effective torque support and very tight stacking of the gears.

With the lifting frames, it is important for financial reasons that the drive pinions are arranged as closely as possible to each other, above all with regard to their vertical arrangement one above the other. For this reason, planetary gears are preferable to spur gears as they build more slowly with the same torque. In addition, only minimum clearance is left between the largest cladding diameters of two planetary gears arranged one above the other. In the prior art described in U.S. Pat. No. 4,678,165 A, with the vertically arranged torque supports, the desired small spacing of two planetary gears arranged one above the other is not possible because their supporting length is in the way. However, the interconnected supports cannot be arranged horizontally because mutual support with coupling rods would no longer work. The present invention solves this problem in that the torque support of each gear unit surrounds the transmission housing of the other respective gear unit in a pincer-like manner.

In the prior art described in U.S. Pat. No. 4,678,165 A, in the case of a torque load the balance is often disturbed when a motor of two interlinked gears malfunctions, e.g. in the case of a power failure. In this case, both gears rotate until they come to a stop somewhere. Therefore, in the event of a malfunction of the first motor, the second gear must also be rendered torque-free immediately by means of a limit switch to avoid damage. This problem does not exist in the present invention.

The torque available in the drive pinions, resulting from the total of the proportionate weight force of the load to be lifted and proportionate frictional forces in the guides of the rack and pinion multiplied by the effective radius of the drive pinion together with the friction torque in the drive pinion bearing and loss torques in the gear must be applied in the motor. In the prior art described in U.S. Pat. No. 4,678,165 A, when the torque requirement of the two adjacent drive pinions is and remains slightly different, for example, as a result of locally varying friction values of the guides, the gears slowly rotate in one direction until something mechanically inhibits the compensatory movement. The system is thus unstable. This problem does not exist in the present invention.

With high torque in the gears, the reaction forces in the prior art described in U.S. Pat. No. 4,678,165 A are also correspondingly high at the attachment points of the coupling rod. In accordance with the law of action=reaction, reaction forces arise on the drive pinion shafts which must be intercepted by their bearing, and which also put a strain on this bearing. In the present invention, as a result of the "interacting" torques the reaction forces on the torque supports and on the drive pinion shafts largely counterbalance each other. With the same torque in the two horizontally adjacent gears, the vertical components of action force and reaction force then counterbalance each other and, apart from the gear weight and a small horizontal force component, the drive pinion shaft is free of high bending moments and high radial forces as far as the spherical roller bearing on the transmission side.

As the electric motors of the gears are usually arranged on the drive pinion shaft to the side of the lifting frame, more space than usual must be left between the lifting frame and motor to prevent the motor knocking against the wall of the lifting frame as a result of the compensatory movements which occur in the prior art described in U.S. Pat. No. 4,678,165 A. It requires a greater total center distance for the primary gear stages of the planetary gears and therefore results in higher costs. This problem does not exist in the present invention.

As several drive pairs are often arranged one above the other in the lifting frame, in the prior art described in U.S. Pat. No. 4,678,165 A a compensatory movement in the first gear pair can influence the second gear pair and thus lead to a mutual accumulation of compensatory movements. This problem does not exist in the present invention.

The gear pair according to the invention, now with its own standard double bearing of the main planetary carrier, can be inspected at the factory without a drive shaft bearing in the series test in accordance with the standard procedure.

Advantageous embodiments of the invention are the subject of the subclaims.

The transmission housings in the area in which the torque supports are mounted and the torque supports of the other gear are supported preferably have a circular cross-section. According to a preferred embodiment, the transmission housings have a ring-shaped flange in the region of their maximum diameter to which the torque support of the respective transmission housing is fastened and on which the support points of the other respective torque supports lie.

The ring-shaped cross-section, in particular in the form of a ring-shaped flange, facilitates surrounding in a pincer-like manner by the torque supports and symmetrical support. The constructive design of the forked torque supports permits axial assembly of the gears on the lifting frame, and the supports of a gear pair can be executed immediately.

According to a preferred embodiment, the angle which is formed between the vertical plane extending through the output shaft of the other respective gear unit and the section between this output shaft and the support points is approx. 5 to 10 degrees. To achieve tight vertical stacking of the gear unit on the lifting frame, the support point of the supports is not placed precisely in the 12 o'clock and 6 o'clock position but at approx. 5° to 10° to the vertical plane. This results in the aforementioned horizontal force component.

However, this offers another additional advantage: due to the axial center of gravity of the gear weight, minus the weight of the main planetary carrier with planets, pins and planetary wheel bearings, as a rule the planetary carrier bearing of the conventional gear on the drive pinion side is underloaded and the gear weight rests almost 100% on the planetary carrier bearing on the side of the gear precursors. Non-radially loaded roller bearings have undesirable roller slippage, and according to the roller bearing manufacturers this is not permitted.

Through the embodiment of the housing flange on the output side as a torque support, close to the first spherical roller bearing of the drive pinion shaft in combination with a line of action under approx. 5° to 10° from the vertical plane, according to the invention the minimal aforementioned horizontal force for the lifting frame-side planetary carrier bearing results from the total of the two horizontal components of the action and reaction force. This horizontal force can be influenced by the choice of angle of the effective direction of the reaction force of the supports relative to the vertical, and this otherwise insufficiently loaded bearing loaded sufficiently radially.

Also advantageous is a rack and pinion drive for lowering and raising a jack-up leg of a lifting vessel, comprising a support structure which can be connected to the lifting vessel and has circular recesses symmetrically on both sides of a line along which a jack-up leg with fitted toothed racks can be moved, a gear pair as aforementioned, wherein the gear pair is mounted radially separated from the support structure and rotatable in two horizontally adjacent recesses, two motors each of which is connected to the drive shaft of a gear unit, and two drive pinions which are each connected to the output shaft of a gear unit.

According to a preferred embodiment, the transmission housings are each mounted on a double bearing of the planetary carrier of the planetary stage.

According to a preferred embodiment, the gear units each have two planetary stages, wherein the transmission housings are each mounted on a double bearing of the planetary carrier of the planetary main stage.

The transmission housings are completely separated from the lifting frame radially, wherein the reaction forces of the individual supports are absorbed on the flange of the support of the adjacent gear unit. The transmission housings are thus mounted on the customary double bearing of the planetary carrier of the transmission main stage without, using force, wherein the planetary carrier is only connected to the drive pinion shaft by way of the multiple-spline profile and here the radial direction and torque transmission of the gear unit take place. The torque supports are forked in design as by lowering and raising the jack-up legs, both torque load directions occur.

According to a preferred embodiment, the output housing flanges on the output side are each arranged in the region of a spherical roller bearing of the drive pinion shaft.

Also advantageous is a lifting vessel with a rack and pinion drive as aforementioned.

Also advantageous is the use of a gear pair as aforementioned in a rack and pinion drive for lowering and raising a jack-up leg of a lifting vessel.

BRIEF DESCRIPTION OF THE DRAWING

The aforementioned properties, features and advantages of this invention and the manner in which they are obtained will be clearer and easier to understand in connection with the following description of exemplary embodiments which are explained in more detail in connection with the drawings. These show.

DETAILED DESCRIPTION OF THE EMBODIMENTS

Figure 1:
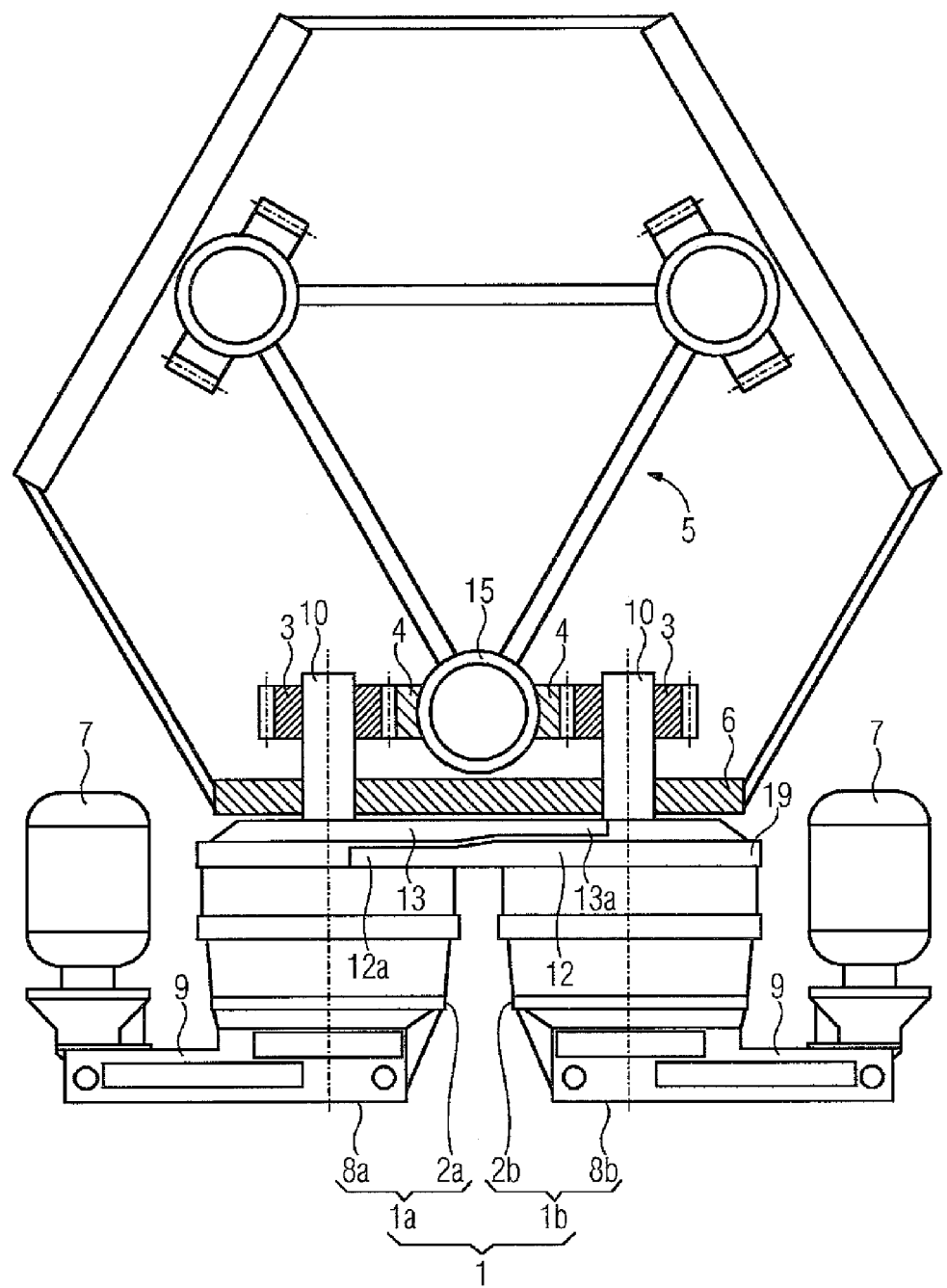
FIG. 1 a view from above of a jack-up leg with a gear pair,
FIG. 2 a side view of a gear pair,
FIG. 3 geometric details concerning the position of the support points of the torque supports,
FIG. 4 a side view of an individual gear,
FIG. 5 in a perspective view a support structure of a lifting vessel for a lowerable leg of a lifting vessel,
FIG. 6 an axial section of a planetary gear stage, and
FIG. 7 a bearing of a drive pinion shaft in a transmission housing.
Figure 2:
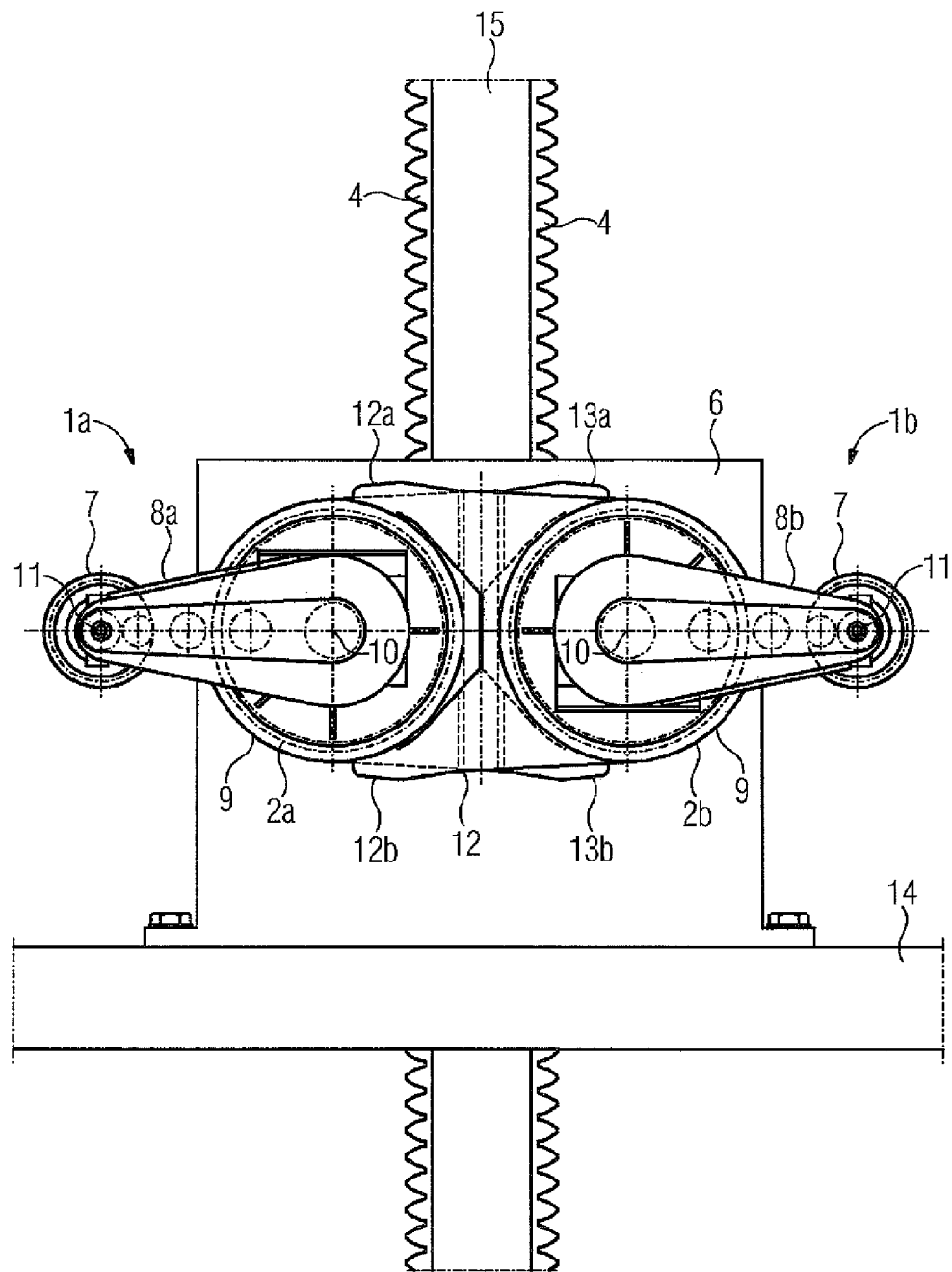

FIGS. 1 and 2 show a torque support of a gear pair 1 comprising two parallel planetary gears 2a, 2b with a fixed center distance and opposing direction of rotation. The gear combination 1 serves to drive jack-up systems by means of a drive pinion 3 and toothed racks 4.

For offshore work in limited depths of water, as a rule vessels or working platforms which can be raised out of the water with so-called jack-up systems are used. Raising and lowering takes place by means of three or more vertically movable stilts 5, so-called support legs or jack-up legs, driven by means of toothed racks 4 with so-called drive pinions 3 on both sides, wherein the pinions 3 are pivoted in a support structure 6 connected to the working deck for storage of the gear, a so-called lifting frame and the toothed racks 4 are permanently connected to the stilts 5. The drive pinions 3 drive the tooth racks 4 as a result of which the stilts 5 are moved relative to the vessel or the platform. The individual drive pinions 3 are driven by means of an electric motor 7 and gears 1a, 1b.

The stilts 5 are supported in a lowered position on the seabed and then raise the vessel or the platform out of the water in order to obtain a stable position regardless of wave movement. During the journey between two working areas, the stilts 5 are in a raised position, the water supporting the vessel or the working platform.

The cross-section of the stilts 5 is triangular or rectangular; each stilt 5 comprises three or four toothed rack systems connected in parallel. Raising of the vessel the platform out of the water requires very strong force which is generated by means of electric motors 7 in combination with a gear unit 1a, 1b as a torque amplifier in the gear tooth engagement of the drive pinion 3 with the toothed rack 4. For this reason, the gear units 1a, 1b have a greater gear ratio, e.g. in the range of 1:3500 to 9000, and the hoisting speeds of the toothed racks 4 are low, e.g. in the range of 0.5 to 1 m/min, whereby the entire motor power to be installed remains at a moderate level.

In addition to the circumferential forces in the gear tooth engagement which generate the actual lifting power, as a result of the contact angle of the gear teeth so-called spreading forces or thrust forces are also generated. To neutralize the thrust forces, the toothed racks 4, which have a rectangular cross-section, are given a tooth profile on both sides and the drive pinions 3 are arranged in equal numbers on both sides of the toothed rack 4. Each toothed rack 4 therefore always has an even number of pinions 3 and therefore also an even number of gear units 1a, 1b.

As the forces to be generated are very great, several pinions 3 are necessary for each toothed rack 4; these pinions 3 are arranged vertically one above the other. The size of the gear stage with the highest torque of the gear units 1a, 1b determines the vertical distance of the pinions 3. As planetary gears raise less in terms of volume than spur gears with the same torque, for the stages for which the gear size is decisive for these lifting vessel applications planetary stages 2a, 2b are used. Upstream are several spur gear stages 8a, 8b which are elongated in the transmission housing 9 so that apart from generating the gear ratio, a certain minimum distance is obtained between the gearbox output shaft 10 and the gearbox input shaft 11. This is necessary so that the motors 7 can be mounted laterally outside the lifting frame 6.

The gear units 1a, 1b arranged next to each other are in a left and right-hand version. The gear units 1a, 1b have two rotational directions and are also loaded in two torque directions. The level of the torque is uneven depending on the load direction during normal operation.

Over time various structural solutions have been developed for these jack-up systems. On the one hand, there are hydraulically operated systems (pin & hole systems). On the other hand, there are rack & pinion systems driven by electric motor. With regard to the bearings of the drive pinion in combination with connections between gear units and pinion bearings and connection of the gear units on the lifting frame, rack & pinion systems can be roughly divided into two versions.

Variant 1:

Variant 1, the most common version today and shown in FIG. 7 is characterized by a lantern gear mounted on both sides in two spherical roller bearings 40a, 40b, designed as a drive pinion shaft 10 with a drive-side outer tooth shaft profile 41, consistent with an inner tooth shaft profile of the hollow shaft not shown here. The gear units are thus mounted on the pinion shaft 10, and the splined shaft profile 41 transmits the torque here.

The spherical roller bearing 40a on the gear unit side has a large bore compared with the second spherical roller bearing 40b because the drive pinion torque must be passed through here. Furthermore, the bearing outer ring is contained in a bushing to be able to insert the tip circle of the drive pinion, which as a rule is larger than the bearing outside diameter, axially into the lifting frame and thus produce engagement with the rack and pinion.

The gear unit is guided radially by means of cylindrical centering in the lifting frame. The reaction torque of the gear unit is absorbed by means of a flange on the lifting frame connected to the ring gear of the main transmission stage. In a subvariant, on a horizontal plane this flange is often fitted with parallel stop bars arranged symmetrically to the gear center and connected to the lifting frame here free of play and torque-proof by means of fitting pieces.

Variant 2:

In Variant 2, the gear unit comprises the drive pinion bearing, wherein the drive pinion is arranged in a "flying" manner on the gearbox output shaft. The smaller spherical roller bearing is missing on the side opposite the gear unit. The second bearing is then either located on the drive pinion shaft in the gear unit or on the geared hub of the planetary carrier. The connection of the transmission housing or the torque support is as in variant 1.

As a result of the aforementioned connection of the gear unit to the lifting frame, neither of the versions described has sound technical torque support of the gear unit, and this results in undesirable bearing and gear loads in the gear unit and to undefined loads in the two spherical roller bearings in variant 1. This is due to the following factors: in both variants 1 and 2, in which the reaction torque is absorbed by means of square flange with stop bars on both sides, the gear units are rigidly connected to the lifting frame in a circumferential direction by means of fitting pieces between the stop bars and supporting surfaces on the lifting frame. The lifting frame and the transmission housing form a unit as if the combination were a single part.

With torque transmission, the splines between the hub of the planetary carrier in the gear unit and the drive pinion shaft are resistant to bending and in a position to transfer bending torque as a result of the tooth forces occurring here. In variant 1, planetary carrier and drive pinion shaft thus form a quadruplicate-mounted shaft (two spherical roller bearings of the drive pinion and two cylindrical roller bearings of the planetary carrier).

Due to different internal clearance in these bearings, elasticity of the components, radial run-outs and angle deviations from the axis of rotation of the splined shaft profiles and eccentricity deviations of the bores in the lifting frame, undefined circumstances arise with regard to bearing forces and bending torques in the splines. Micromovements and consequently fretting corrosion and wear may therefore also occur in the splines.

A possible solution would be to omit the bearing of the planetary carrier and to mount the planetary carrier in a "flying" manner on the drive pinion shaft. In this case, however, the carrier is misaligned with the internal gear and the central pinion (=sun) as a result of the bearing play of the spherical roller bearing, and the planetary carrier with the planets is also tilted in relation to the internal gear and the central pinion as a result of the deflection of the drive pinion. This solution is therefore unacceptable.

A further disadvantage here is that the gear can only undergo a function test in combination with the drive pinion and its two spherical roller bearings.

The same applies to variant 2. If a planetary carrier bearing on the output side and a drive pinion shaft bearing on the gear side are combined to form one bearing, the result is still a triple bearing with the same aforementioned disadvantages.

As a result of the flying arrangement of the lantern gear toothing, the elastic deformation of the drive pinion shaft is very great and in the case of a double bearing with a planetary carrier likewise arranged in a "flying" manner would likewise result in major center offset and tilting of the planetary carrier.

Apart from these technical disadvantages, the costs are also very high in comparison with the solution according to the invention.

FIGS. 1 and 2 show a view from above or a side view of a rack and pinion drive with a gear pair 1 according to the invention. This is a gear pair for a lifting vessel 1 for a rack and pinion drive for lowering and raising a jack-up leg of a lifting vessel. Each gear unit 1a, 1b of the gear pairs 1 comprises a planetary gear 2a, 2b comprising two planetary stages and a multi-stage spur gear 8a, 8b upstream of the planetary gears 2a, 2b. Each of the gear units 1a, 1b is mounted in circular recesses of the lifting frame 6 by way of a cylindrical transmission housing surrounding the planetary stages. The drive shafts 11 of the gear units 1a, 1b are each connected to electric motors 7a, 7b. The output shafts 10 of the gear units 1a, 1b are each connected to the drive pinion 3. The drive pinions 3 each mesh with toothed racks 4 which are attached to opposite sides of the support leg edge 15. Each support leg 5 is designed as a framework-like structure the envelope of which has, for example, the structure of a prism with a triangular base. Each support leg 5 has toothed racks 4 which each extend in parallel along one of the three vertical support leg edges 15 of the support leg 5.

The axes of the output shafts 10 are aligned in parallel so that the opposing meshing of the pinions 3 in the toothed racks 4 generates uniform but opposing reaction torques. These reaction torques support the two gear units 1a, 1b by means of torque supports 12, 13 on the transmission housing of the other respective gear unit 1b, 1a. Each of the torque supports 12, 13 is fastened to a ring-shaped flange 19 which is arranged on the outer circumference of that part of the transmission housing surrounding the second planetary stage. The torque supports 12, 13 are pincer-like in design, wherein the two pincer arms 12a, 12b or 13a, 13b are located on both sides of a horizontal central axis of the gear units 1a, 1b which is formed by a connecting line of the center points of the output shafts 10 on which the transmission housing 9 is located.

Figure 3:
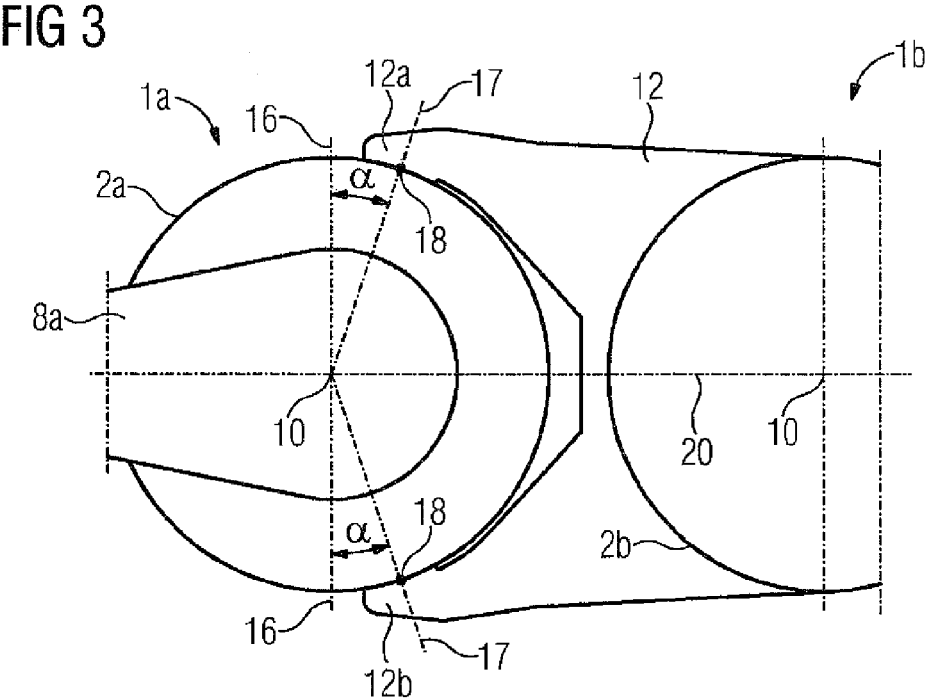

FIG. 3 shows the position of the pincer arms 12a, 12b of the torque support 12 with regard to the transmission housing of the planetary gear 2a. The support points 18 of the pincer arms 12a, 12b are located towards the gear unit 2b relative to a vertical plane 16 extending through the output shaft 10 of the other respective gear unit which has the torque support 12. The angle α, which is enclosed between the vertical plane 16 extending through the output shaft 10 of the other respective gear unit 2a and the section 17 between this output shaft 10 and the support points 18, is in a range of 5 to 10 degrees. A connecting line 20 which runs through the centers of the output shafts 10 of the two gear units 1a, 1b forms a central axis in relation to which the support points 18 are arranged symmetrically.

Figure 4:
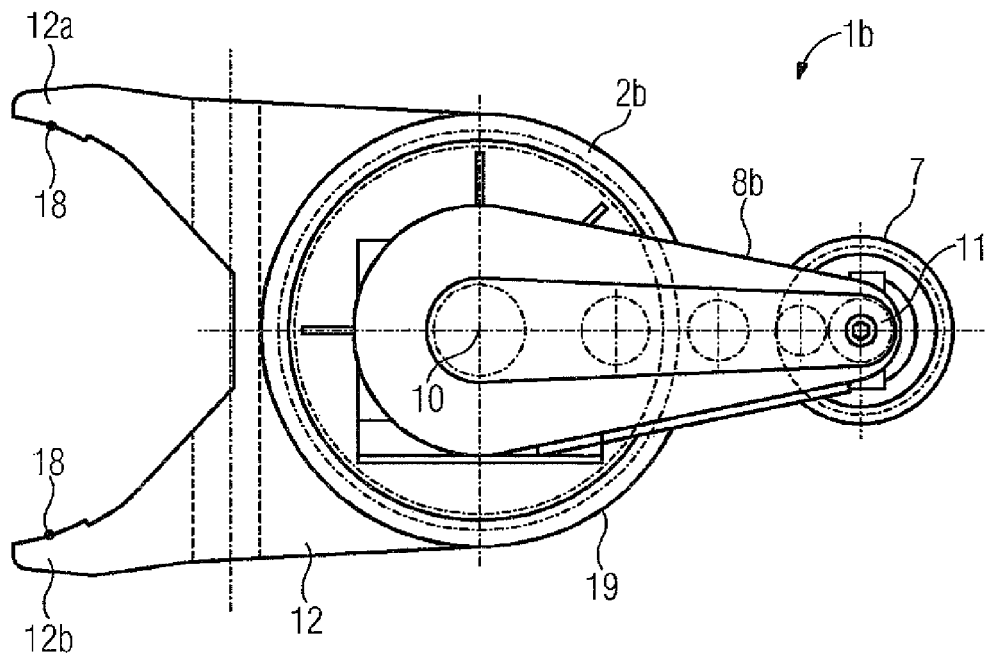

For clarification, FIG. 4 shows a side view of an individual gear unit 1b of a gear pair according to the invention.

The gear pair 1b has a multi-stage helical preliminary stage 8b the output shaft of which is connected to an input shaft of a two-stage, coaxial planetary gear 2b. The input shaft 11 of the helical preliminary stage 8b is connected to a rotor shaft of an electric motor 7.

The torque support 12 connected via a ring-shaped flange 19 to the transmission housing of the planetary gear 2b forks into two pincer-like arms 12a, 12b with inside support points 18.

Figure 5:
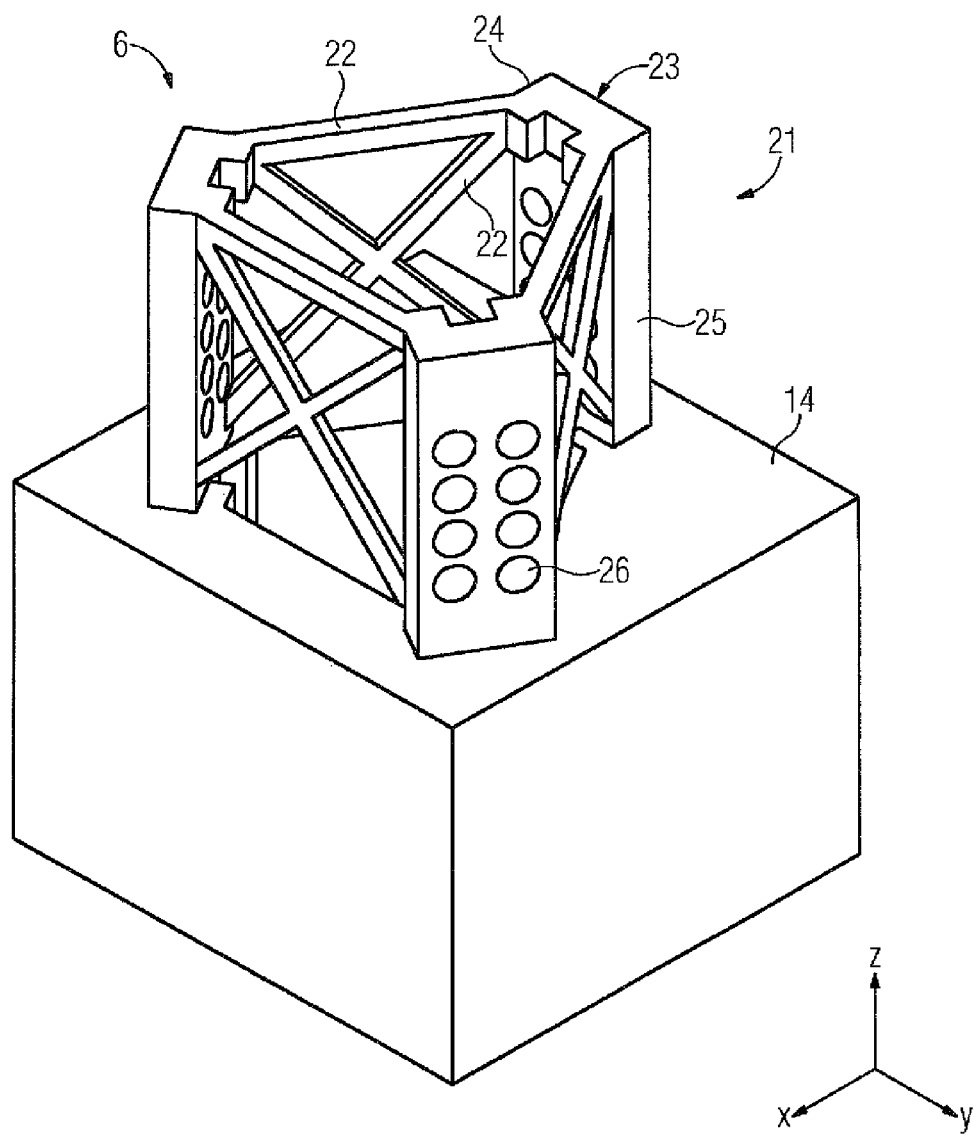

FIG. 5 shows a diagrammatic view of a lifting frame 6 of a lifting vessel in a perspective view. The lifting frame 6 mounted on a lifting vessel 14 has three supporting frames 21 which are interlinked by connecting elements 22 in a framework-like manner. The supporting frames 21 are each adjacent to one of the support leg edges of the respective support leg (see FIG. 1), so that a longitudinal axis of the supporting frame 21 is parallel to this support leg edge 15 and therefore also parallel to the toothed rack extending along this support leg edge 15 of the support leg 5.

The supporting frame 21 has a rear wall 23 and two side walls 24, 25 at an angle to the rear wall 23. The rear wall 23 has eight continuous, ring-shaped recesses 26 which are designed to accommodate one gear unit 1a, 1b each of the rack and pinion drive of the associated lifting vessel. The recesses 26 are arranged in the form of a matrix with two rows arranged next to each other, wherein each row has four recesses 26 arranged one above the other.

Figure 6:
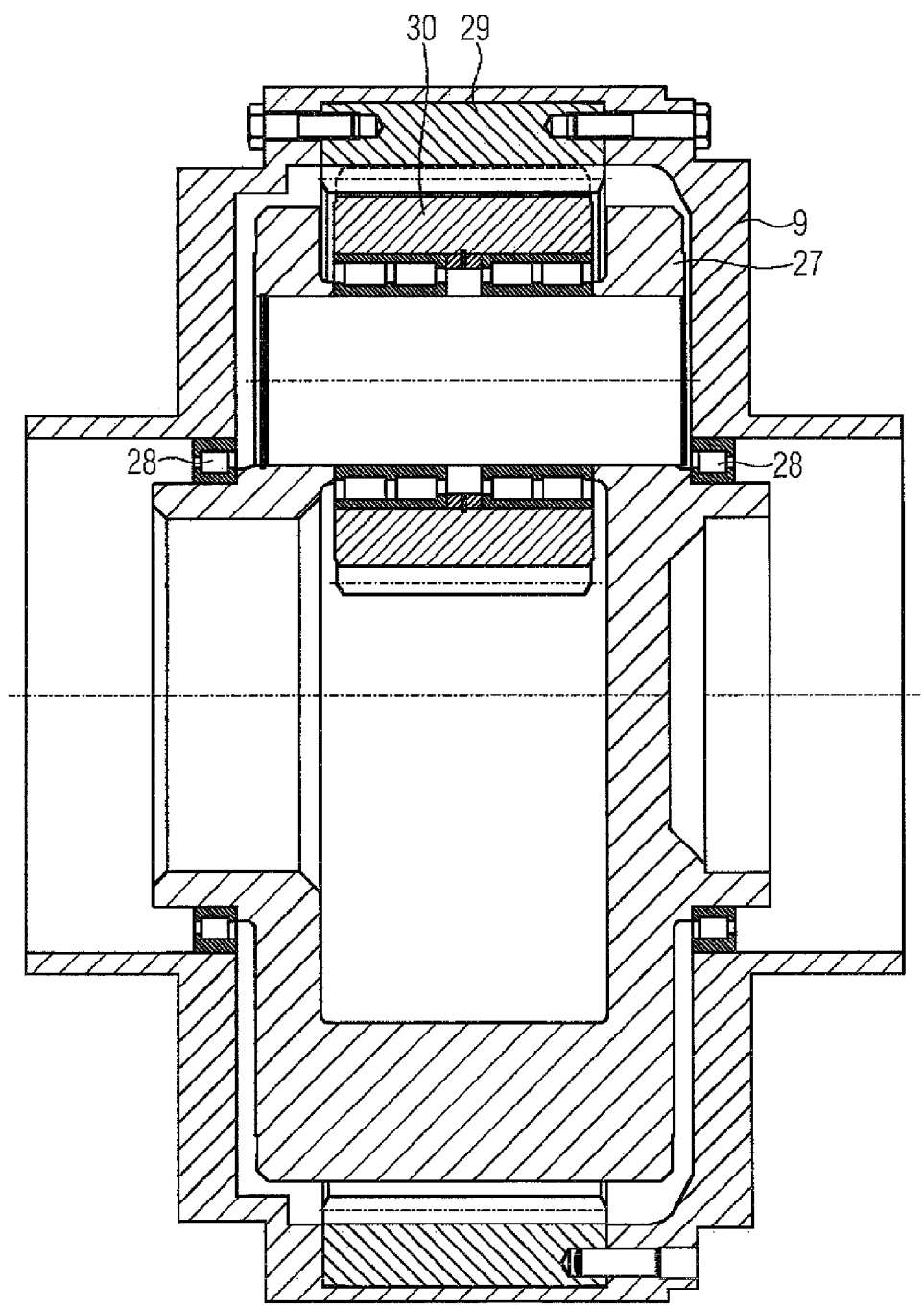

FIG. 6 shows a transmission housing 9 which is mounted on a double bearing 28 of a planetary carrier 27 of a planetary stage of the gear pair 1 according to the invention. A pivoting planetary gear 30 in the planetary carrier 27 meshes with the internal gear of a ring gear 29 arranged radially in the transmission housing 9.

The invention claimed is:

1. A gear pair for a lifting vessel for a rack and pinion drive for lowering and raising a jack-up leg of the lifting vessel: said gear pair comprising:
two gear units comprising a first gear unit and a second gear unit driving in opposite directions of rotation and configured for engagement with two tooth racks on the jack-up leg, respectively; each said gear unit comprising:
a drive shaft for connection to a drive,
an output shaft for connection to a drive pinion,
a transmission housing, and
a planetary stage mounted in the transmission housing;
the first gear unit comprising a first torque support configured to enable support of the first gear unit on the second gear unit, said first torque support of the first gear unit surrounding the transmission housing of the second gear unit in a spincer-like manner and contacting the transmission housing of the second gear unit symmetrically with respect to a straight line connecting the output shafts of the gear units at two first support points on the first torque support, the two first support points in relation to a first vertical plane extending through the output shaft of the second gear unit and are located offset towards the first gear unit having the first torque support;
the second gear unit comprising a second torque support configured to enable support of the second gear unit on the first gear unit, said second torque support of the second gear unit surrounding the transmission housing of the first gear unit in a spincer-like manner and contacting the transmission housing of the first gear unit symmetrically with respect to a straight line connecting the output shafts of the gear units at two second support points on the second torque support, the two second support points in relation to a second vertical plane extending through the output shaft of the first gear unit and are located offset towards the second gear unit having the second torque support;
the first two support points and the second two support points are located between the first and second vertical planes extending through the output shafts of the gear units.

2. The gear pair of claim 1, wherein the transmission housing of each said first and second gear units has a ring-shaped cross-section in an area in which the first and second torque supports are mounted or fitted.

3. The gear pair of claim 1, wherein the first vertical plane and a section between the output shaft of the second gear unit and the first two support points define a first angle in a first range of 5 to 10 degrees and wherein the second vertical plane and a section between the output shaft of the first gear unit and the second two support points define a second angle in a second range of 5 to 10 degrees.

4. The gear pair of claim 1, wherein the transmission housing of the first gear unit has in a region of maximum diameter a ring-shaped flange for fastening of the first torque support, said second support points of the second torque support of the second gear unit being located on the flange.

5. A rack and pinion drive for lowering and raising of a jack-up leg of a lifting vessel, comprising:
a support structure configured for connection to the lifting vessel and having symmetrical circular recesses on both sides of a line along which the jack-up leg with mounted toothed racks is movable;
a gear pair radially separated from the support structure and rotatable in two horizontally adjacent ones of the recesses, said gear pair including two gear units comprising a first gear unit and a second gear unit driving in opposite directions of rotation and configured for engagement with two tooth racks on the jack-up leg, respectively, each said gear unit comprising:
a drive shaft for connection to a drive,
an output shaft,
a transmission housing, and
at least one planetary stage mounted in the transmission housing,
the first gear unit comprising a first torque support configured to enable support of the first gear unit on the second gear unit, said first torque support of the first gear unit surrounding the transmission housing of the second gear unit in a spincer-like manner and contacting the transmission housing of the second gear unit symmetrically with respect to a straight line connecting the output shafts of the gear units at two first support points on the first torque support, the two first support points in relation to a first vertical plane extending through the output shaft of the second gear unit and are located offset towards the first gear unit having the first torque support;
the second gear unit comprising a second torque support configured to enable support of the second gear unit on the first gear unit, said second torque support of the second gear unit surrounding the transmission housing of the first gear unit in a spincer-like manner and contacting the transmission housing of the first gear unit symmetrically with respect to a straight line connecting the output shafts of the gear units at two second support points on the second torque support, the two second support points in relation to a second vertical plane extending through the output shaft of the first gear unit and are located offset towards the second gear unit having the second torque support;
the first two support points and the second two support points are located between the first and second vertical planes extending through the output shafts of the gear units;
two motors connected to the drive shafts of the first and second gear units; and
two drive pinions connected to the output shafts of the first and second gear units in one-to-one correspondence.

6. The rack and pinion drive of claim 5, wherein the at least one planetary stage of each of the first and second gear units is one planetary stage, the planetary stage including a planetary carrier, said transmission housings of the first and second gear units mounted on a double bearing of the respective planetary carriers.

7. The rack and pinion drive of claim 5, wherein the at least one planetary stage of each of the first and second gear units is two planetary stages, the first and second transmission housings mounted on a double bearing of a respective planetary carrier of a respective planetary main stage of the two planetary stages.

8. The rack and pinion drive of claim 5, wherein the transmission housing of each of the first and the second gear units having a flange on an output side, said drive pinions having each a drive pinion shaft, with the flanges of the transmission housings being each arranged in a region of a spherical roller bearing of the drive pinion shafts.

9. A lifting vessel, comprising a rack and pinion drive, said rack and pinion drive comprising:
a support structure configured for connection to the lifting vessel and having symmetrical circular recesses on both sides of a line along which a jack-up leg with two mounted tooth racks is movable;

a gear pair radially separated from the support structure and rotatable in two horizontally adjacent ones of the recesses, said gear pair including two gear units driving in opposite directions of rotation and configured for engagement with said two tooth racks on the jack-up leg, respectively, each said gear unit comprising:

a drive shaft for connection to a drive, an output shaft, a transmission housing, and at least one planetary stage mounted in the transmission housing, the first gear unit comprising a first torque support configured to enable support of the first gear unit on the second gear unit, said first torque support of the first gear unit surrounding the transmission housing of the second gear unit in a spincer-like manner and contacting the transmission housing of the second gear unit symmetrically with respect to a straight line connecting the output shafts of the gear units at two first support points on the first torque support, the two first support points in relation to a first vertical plane extending through the output shaft of the second gear unit and are located offset towards the first gear unit having the first torque support;

the second gear unit comprising a second torque support configured to enable support of the second gear unit on the first gear unit, said second torque support of the second gear unit surrounding the transmission housing of the first gear unit in a spincer-like manner and contacting the transmission housing of the first gear unit symmetrically with respect to a straight line connecting the output shafts of the gear units at two second support points on the second torque support, the two second support points in relation to a second vertical plane extending through the output shaft of the first gear unit and are located offset towards the second gear unit having the second torque support;

the first two support points and the second two support points are located between the first and second vertical planes extending through the output shafts of the gear units;

two motors connected to the drive shafts of the first and second gear units; and two drive pinions connected to the output shafts of the first and second gear units in one-to-one correspondence.

10. The lifting vessel of claim 9, wherein the at least one planetary stage of each of the first and second gear units is one planetary stage, the planetary stage including a planetary carrier, said transmission housings of the first and second gear units mounted on a double bearing of the respective planetary carriers.

11. The lifting vessel of claim 9, wherein the at least one planetary stage of each of the first and second gear units is two planetary stages, the first and second transmission housings mounted on a double bearing of a respective planetary carrier of a respective planetary main stage of the two planetary stages.

12. The lifting vessel of claim 9, wherein the transmission housing of each of the first and the second gear units having a flange on an output side, said drive pinions having each a drive pinion shaft, with the flanges of the transmission housings being each arranged in a region of a spherical roller bearing of the drive pinion shafts.

* * * * *